United States Patent
Halpern et al.

(10) Patent No.: US 9,479,111 B2
(45) Date of Patent: Oct. 25, 2016

(54) PORTABLE AND MODULAR POWER GENERATION DEVICE

(71) Applicant: Gridless Power Corporation, Collingswood, NJ (US)

(72) Inventors: Jason Halpern, Collingswood, NJ (US); J. D. Albert, Philadelphia, PA (US)

(73) Assignee: GRIDLESS POWER CORPORATION, Collingswood, NJ (US)

( * ) Notice: Subject to any disclaimer, the term of this patent is extended or adjusted under 35 U.S.C. 154(b) by 0 days.

(21) Appl. No.: 13/862,150

(22) Filed: Apr. 12, 2013

(65) Prior Publication Data

US 2015/0091494 A1  Apr. 2, 2015

Related U.S. Application Data

(60) Provisional application No. 61/623,388, filed on Apr. 12, 2012.

(51) Int. Cl.
| | |
|---|---|
| *H01M 10/44* | (2006.01) |
| *H01L 31/042* | (2014.01) |
| *H01L 31/00* | (2006.01) |
| *H02S 30/10* | (2014.01) |
| *H02J 7/35* | (2006.01) |
| *H02S 40/38* | (2014.01) |
| *H02S 10/40* | (2014.01) |
| *H02S 30/20* | (2014.01) |
| *G09F 15/00* | (2006.01) |

(52) U.S. Cl.
CPC .......... *H02S 30/10* (2014.12); *G09F 15/0043* (2013.01); *H02J 7/355* (2013.01); *H02S 10/40* (2014.12); *H02S 30/20* (2014.12); *H02S 40/38* (2014.12); *Y10T 29/49002* (2015.01); *Y10T 29/49169* (2015.01)

(58) Field of Classification Search
CPC ... H01L 31/042; H01L 31/05; H01L 31/048; H01L 27/1423; H02J 3/383; H02J 7/35; H02J 7/355; F24F 1/00; Y02E 60/12; Y02E 10/50; Y02E 10/542; Y02E 10/544; Y02E 10/548; H01M 10/465; H01M 16/006; B82Y 10/00
USPC .................................. 320/101; 136/244, 252
See application file for complete search history.

(56) References Cited

U.S. PATENT DOCUMENTS

| | | | | |
|---|---|---|---|---|
| D358,679 S | * | 5/1995 | Garrity | D26/138 |
| 8,246,193 B2 | * | 8/2012 | Weng | F21L 4/00 362/157 |

(Continued)

FOREIGN PATENT DOCUMENTS

| | | | | |
|---|---|---|---|---|
| KR | 2005101958 | * | 4/2004 | B08B 1/04 |

*Primary Examiner* — Richard Isla Rodas
*Assistant Examiner* — Mohammed J Sharief
(74) *Attorney, Agent, or Firm* — Gordon Rees Scully Mansukhani, LLP

(57) ABSTRACT

A portable power generation device includes a protective case and a power source. The protective case has a lower case portion and an upper case portion, the upper case portion including a plurality of upper case portion segments, wherein the upper case portion is rotatable with respect to the lower case portion between a closed configuration and an open configuration. The power source is sized to fit within the protective case in the closed configuration, rotatable with respect to the lower case portion, and supported by the protective case in the open configuration.

3 Claims, 7 Drawing Sheets

(56) References Cited

U.S. PATENT DOCUMENTS

| | | | | |
|---|---|---|---|---|
| 8,313,209 B2* | 11/2012 | Connor | | F21L 4/08 320/101 |
| 2005/0137942 A1* | 6/2005 | LaFleur | | G07G 1/0018 705/26.1 |
| 2007/0075676 A1* | 4/2007 | Novak | | H02J 7/355 320/101 |
| 2009/0039705 A1* | 2/2009 | Lyman | | H01M 2/1022 307/64 |
| 2009/0139814 A1* | 6/2009 | Grossman et al. | | 190/18 A |
| 2010/0210322 A1* | 8/2010 | Kim | | G06F 1/263 455/574 |
| 2011/0062911 A1* | 3/2011 | Lloyd et al. | | 320/101 |
| 2011/0157879 A1* | 6/2011 | Chang | | F21S 9/03 362/183 |
| 2012/0042936 A1* | 2/2012 | Feichtinger et al. | | 136/252 |
| 2012/0073885 A1* | 3/2012 | Glynn | | 180/2.2 |
| 2012/0150375 A1* | 6/2012 | Adachi et al. | | 701/22 |
| 2012/0212067 A1* | 8/2012 | Lai | | 307/84 |
| 2013/0043826 A1* | 2/2013 | Workman et al. | | 320/101 |
| 2013/0063027 A1* | 3/2013 | Recker | | H05B 33/0803 315/86 |
| 2014/0375272 A1* | 12/2014 | Johnsen et al. | | 320/136 |

* cited by examiner

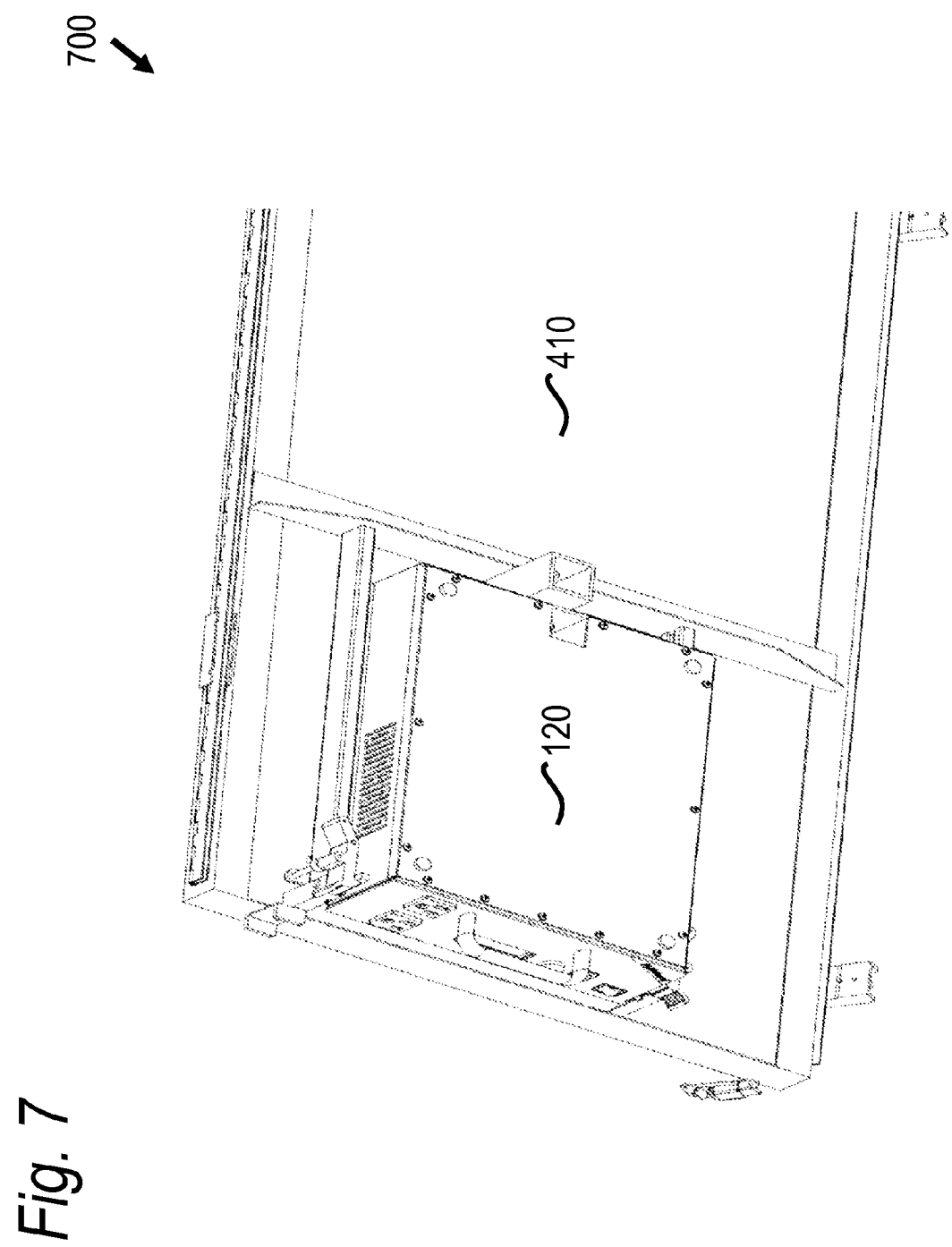

PORTABLE AND MODULAR POWER GENERATION DEVICE

RELATED APPLICATIONS

This application claims priority to U.S. provisional application Ser. No. 61/623,388, filed Apr. 12, 2012, which is incorporated herein by reference in its entirety. This application is also related to U.S. patent application Ser. No. 12/622,821, filed Nov. 20, 2009, and Ser. No. 13/035,621, filed Feb. 25, 2011, both of which are hereby incorporated by reference in their entirety.

TECHNOLOGY FIELD

The present invention relates to a portable power generation device for gathering power from a power source and delivering it to one or more loads connected thereto.

BACKGROUND

Solar power offers a number of advantages for power generation. For example, solar power offers the promise of clean, renewable energy. In addition, solar power may be generated wherever solar radiation is available. Thus, solar power may facilitate a decentralized energy system by enabling electricity to be generated anywhere, including at or near the point of consumption. Moreover, solar power may be generated without the use of hydrocarbons, thereby reducing our dependence on fossil fuels.

To date, however, developments in solar power generation have failed to address certain needs of the end user, and do not take full advantage of solar energy's beneficial characteristics. In particular, existing solar installations are generally permanent, while many possible uses of solar energy require temporary installations. As an example, in the agricultural sector, a farmer may want to harvest solar power during a certain period of time over which a field would otherwise go unused. Similarly, in disaster relief scenarios in which other sources of power are unavailable, first responders or other relief personnel may want to harvest solar power temporarily to charge or power communication devices, lighting, tools, and machinery used in providing an effective response to the disaster. It is often unfeasible to use permanent installations in such scenarios due to the lengthy and costly installation process associated with such installations.

In addition, many of the current solar technologies are sensitive to harsh operating environments. The critical functional surfaces on solar power generators (e.g., mirrors, lenses, glass coverings, solar panels, and/or cells) are often exposed to chemicals, dust, or other debris, for example, and may become damaged or coated by dust or other debris, thus reducing overall effectiveness. Moreover, existing installations are often very complex, typically requiring a large amount time to install by trained experts. What is needed is a portable or semi-portable solar power generation device, capable of rapid, scaled deployment by an end user of the power or an independent power generator.

SUMMARY

Embodiments of the present invention address and overcome one or more of the above shortcomings and drawbacks, by providing methods, systems, and devices corresponding to a portable power generation device in which a power source may be transported and supported by a protective case. Part of the device may be modularly separable from the power source to remotely provide power to a device. This technology is particularly well-suited for, but not limited to, providing power in a temporary installation to an end user of the electricity or an independent power generator.

Embodiments of the present invention are directed to a portable power generation device having a protective case and a primary power source. The protective case has a lower case portion and an upper case portion, the upper case portion including a plurality of upper case portion segments, wherein the upper case portion is rotatable with respect to the lower case portion between a closed configuration and an open configuration. The power source is sized to fit within the protective case in the closed configuration, rotatable with respect to the lower case portion, and supported by the protective case in the open configuration. In one embodiment, the power control unit is visible and accessible to a user when the protective case is in the open configuration.

In one embodiment, the upper case portion of the protective case comprises a surface presenting at least one advertisement while the protective case is in the open configuration. In one embodiment, the upper case portion of the protective case comprises a surface that deflects wind from at least one side of the power source while the protective case is in the open configuration.

In some embodiments, the portable power generation device includes a power control unit operably coupled to the power source and capable of providing power to one or more loads. In one embodiment, the power source is a solar panel and at the power control unit is attached to the rear of the solar panel. In one embodiment, the power control unit comprises: a removable user interface component, the user interface component including a plurality of outlets for connecting the portable power generation device to one or more power loads. In one embodiment, the power control unit comprises: an energy storage component operable to store excess power received from the power source; and a balance of system component operable to transfer energy between the power source and the energy storage component.

The portable power generation device may include various structural elements. For example, in one embodiment, the portable power generation device further comprises a plurality of wheels rotatably attached to the protective case; and a plurality of wheel housings, each wheel housing attached to one of the plurality of wheels. According to some embodiments, the protective case is shaped to allow stacking of the portable power generation device with a second portable power generation device. In one embodiment, the upper case portion further comprises a hinge component which allows a first upper case portion segment to be folded upon a second upper case portion segment when the protective case is in the open configuration.

In one embodiment, the portable power generation device comprises a data communication device configured to transfer data between two or more user communication devices.

According to one embodiment, a portable power generation system comprises a protective case having a lower case portion having two or more wheels rotatably mounted thereto, the lower case portion including an interior region adapted to receive the power source; and an upper case portion arranged above the lower case portion and pivotally supported at one end of the lower case portion to move between an open configuration and a closed configuration. The portable power generation system further comprises one or more attachment members adapted to attach the power source to an interior portion of the upper case portion when the upper case portion is in an open configuration; and a power source sized to fit within the protective case in the closed configuration, and rotatable with respect to the lower case portion and supported by the protective case in the open configuration. The portable power generation system may further comprise a power control unit operably coupled to the power source.

The portable power generation system may include various structural elements. In one embodiment, the portable power generation system comprises a handle element attached to the lower case portion. In one embodiment, the handle element is coupled to a front portion of the device and one or more additional handle elements are coupled to a side portion of the device. In one embodiment, the system comprises one or more locking mechanisms operable to prevent movement of the protective case portion between the open configuration and the closed configuration.

Another embodiment of the present invention is directed to a method for operating a portable power generation device, having a solar panel, an upper case portion, and a lower case portion. The method comprises the steps of: moving the upper case portion into an initial configuration by rotating a first segment of the upper case portion relative to a second segment of the upper case portion; moving the upper case portion from the initial configuration to an open configuration by rotating the upper case portion relative to the lower case portion; rotating the solar panel relative to the lower case portion to align and edge of the solar panel with the upper case portion in the open configuration; and engaging the edge of the solar panel with the upper case portion in the open configuration.

In one embodiment, the method for operating a portable power generation device further comprises the step of connecting at least one load to a power control unit operably coupled to the power generation device. In another embodiment, the method further comprises the steps of determining that a threshold power level has been stored in a power control unit located in the power generation device; removing the power control unit from the power generation device; and connecting at least one load to the removed power control unit.

Additional features and advantages of the invention will be made apparent from the following detailed description of illustrative embodiments that proceeds with reference to the accompanying drawings.

BRIEF DESCRIPTION OF THE DRAWINGS

Aspects, features, benefits and advantages of the present invention will be apparent with regard to the following description and accompanying drawings, of which:

FIG. 7 provides a perspective view of an embodiment of the portable power generation device that illustrates the modularity of the power control unit.

DETAILED DESCRIPTION

The following disclosure describes the present invention according to several embodiments directed at portable power generation devices. This disclosure is not limited to the particular systems, devices, and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this document is to be construed as an admission that the embodiments described in this document are not entitled to antedate such disclosure by virtue of prior invention.

Figure 1:
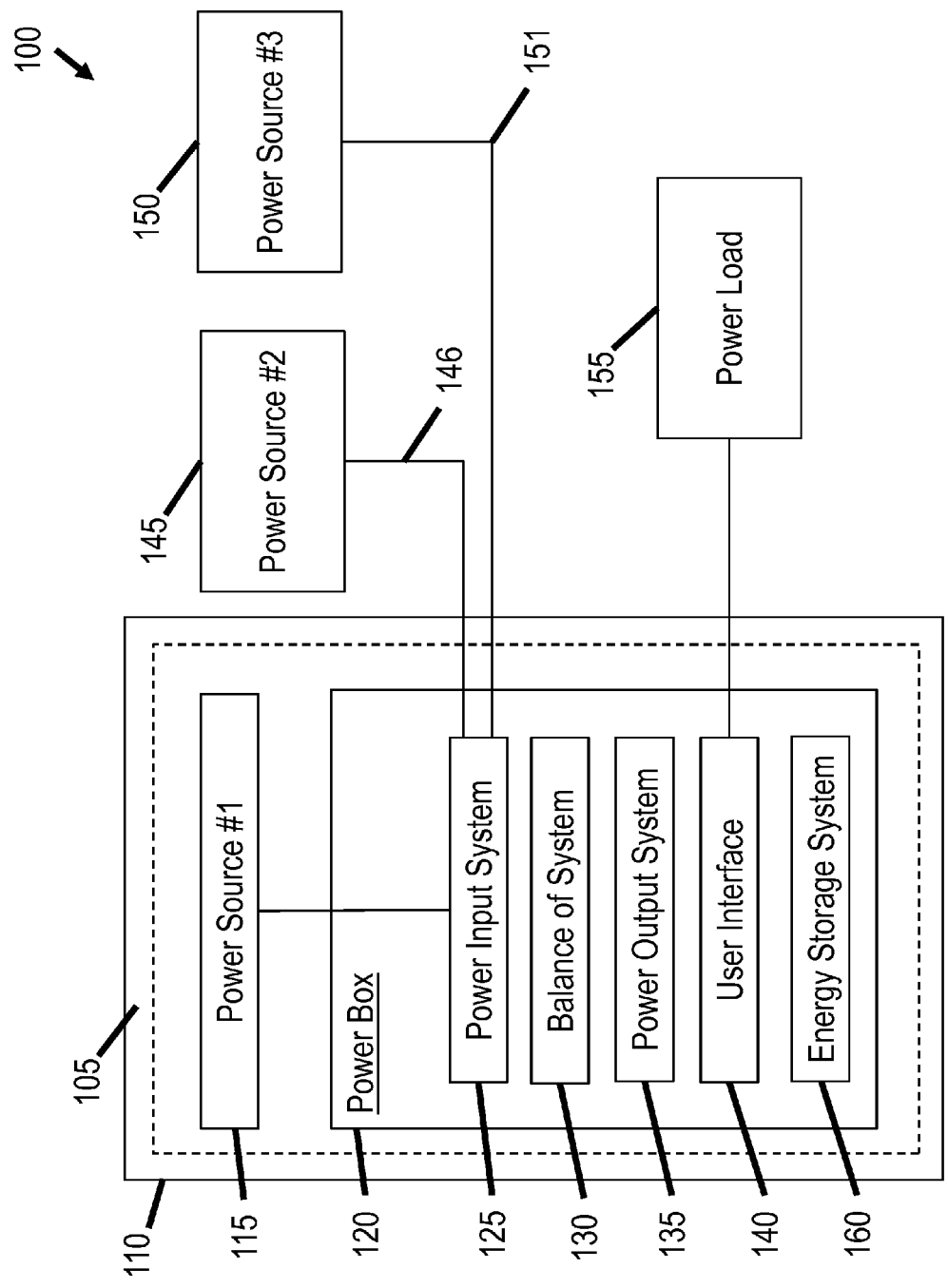
FIG. 1 is a block diagram of a system utilizing a portable power generation device according to one embodiment of the present invention.

FIG. 1 is a block diagram of a system 100 utilizing a portable power generation device 110 according to one embodiment of the present invention. The portable power generation device 110 may include a power source 115 and a power control unit 120 installed in a protective case 105. It should be noted that, in some embodiments, the protective case 105 may be omitted. In such embodiments, the portable power generation device 110 may include a power source 115, a power control unit 120 and, optionally, one or more additional components.

The power control unit 120 includes a power input system 125, a balance of system 130, a power output system 135, a user interface 140, and an energy storage system 160. The components of the power control unit 120, when operated in concert, allow the power from the power source(s) (e.g., 115, 145, and 150) to be delivered to one or more power loads 155. In one embodiment, the power control unit 120 is an optional component of the portable power generation device 110 that may be removed or omitted from the device altogether. In some embodiments, the power control unit 120 is removable from the portable power generation device 110, for example, via a sliding motion.

The structure housing the power control unit may be made of various materials and in various shapes. In one embodiment, the housing is a box-like structure made of an aluminum, steel, or another metal.

In FIG. 1, three power sources are illustrated. A primary power source 115 is directly coupled to portable power generation device 110. In one embodiment, this primary power source 115 is a solar panel stored within the protective case 105. Additionally, in the example of FIG. 1, two additional power sources 145 and 150 are shown coupled to portable power generation device 110 the via connections 146 and 151, respectively. Collectively, power sources 115, 145, 150 form a network of power source devices. In one embodiment, additional power sources 145 and 150 are plugged into auxiliary inputs (not shown in FIG. 1) in the power input system 124. Although there are two additional power sources illustrated in FIG. 1, one skilled in the art would understand that the present invention is not limited to two sources. Depending on the configuration of the portable power generation device 110, any number of additional power sources may be used within the scope of the present invention. The power sources 115, 145, 150 used by the portable generation device 110 may include any utilize any power generation technology known in the art including, but not limited to, solar, combustion, fuel cell, and/or wind technologies.

Continuing with reference to FIG. 1, user interface 140 may include one or more outlets or other operable connections for connecting the portable power generation device 110 to the loads 155. The outlets or other operable connections on the user interface 140 may include, for example, standard 15-amp, 20-amp, 30-amp, or 50-amp outlets, as well as specialty outlets used, for example, by vehicles, appliances, and power tools. Additionally, in one embodiment, the user interface 140 is removable and may be replaced with an alternative user interface (not shown in FIG. 1) to support a broader range of outlets or other operable connections. For example, a user interface 140 may include outlets or other operable connections specific to the plug and socket standards of a particular country or geographic region.

The balance of system component 130 of FIG. 1 may be used to adjust and convert DC electricity to the proper form and magnitude required by an alternating-current (AC) load (e.g., load 155). The balance of system component may be coupled directly or indirectly with the energy storage system 160 to ensure that power remains available in the event that power sources 115, 145, and 150 are not meeting the demands of the power load 155. The balance of the system component 130 may operate autonomously to balance system output from the power sources 115, 145, and 150 and the energy storage system 160. Alternatively, the balance of system component 130 may require intervention from an operator or other user to switch between the power sources 115, 145, and 150, and the energy storage system 160.

The energy storage system 160 illustrated in FIG. 1 may include any storage components suitable storing electrical energy within the portable power generation device. These storage components may generally include any storage technology known in the art, including technologies that utilize chemical, biological, electrochemical, electrical, mechanical, and thermal storage methods. In one embodiment, the energy storage system 160 includes one or more rechargeable batteries. The energy storage system 160 may be removed from the portable power generation device 110 and replaced with a new energy storage system (not shown in FIG. 1), for example, when storage components require replacement or an alternative storage technology is desired.

The portable power generation device may include additional components not shown in FIG. 1 to offer functionality beyond providing power to devices. For example, the portable power generation device 110 may be modified or designed for use by disaster relief personnel. In one embodiment, the portable power generation device 110 includes a battery charging attachment configured to receive rechargeable batteries used in radios or other communication devices such that the batteries can be charged while in the field, e.g., in an area away from conventional power generation means. In other embodiments, the portable power generation device 110 includes an external communication device such as a cellular data transceiver (e.g., a 3G or 4G data transceiver), a satellite data transceiver, or other similar data communication devices. In such embodiments, the portable power generation device 110 may be further configured to operate as a wireless communication hub for cellular telephone data, or to provide a mobile Wi-Fi hotspot for wireless data transfer between one or more computing devices.

Figure 2:
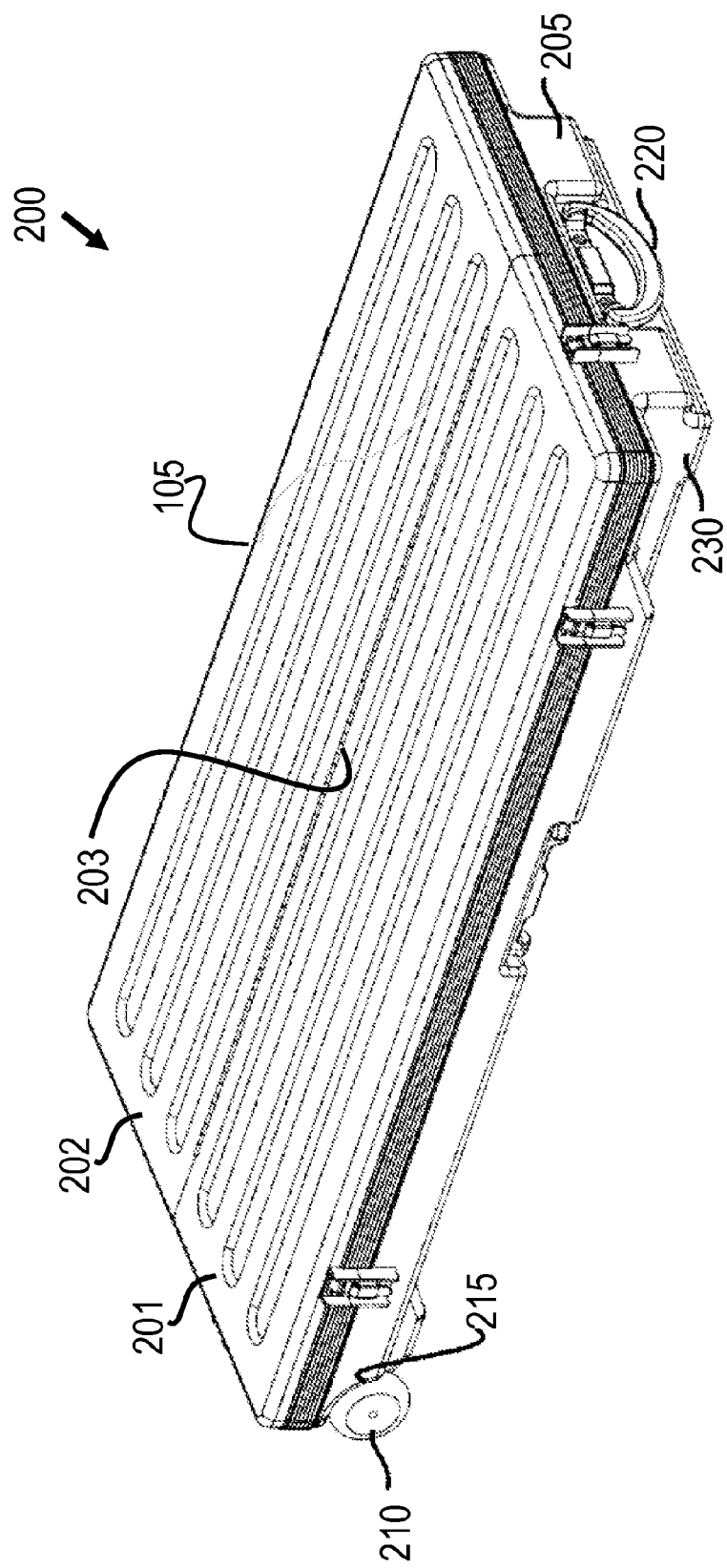
FIG. 2 illustrates an embodiment of the portable power generation device in a closed configuration.

FIG. 2 illustrates an embodiment of the portable power generation device 110 with its protective case, in a closed configuration 200. In this configuration 200, the power source 115 and power control unit 120 are fully enclosed by the protective case 105 in order to achieve maximum protection on the internal components of the device 110 (e.g., power control unit 120 and power source 115). The one or more upper case portion segments 201, 202 and a lower case portion 205 of the protective case 105 operate together to provide an enclosure around the internal components of the device 110. In the embodiment of FIG. 2, the two upper case portions 201, 202 are connected by one or more hinges 203 to allow movement of one segment with respect to the other (e.g., folding segment over the other). In another embodiment, a pivoting mechanism may be used to move one or both segments 201, 202.

In one embodiment, the closed configuration 200 illustrated in FIG. 2 creates a water-tight seal around the internal components of the device 110. In an alternative embodiment, the power source 115 may be enclosed in a way that does not create a water-tight seal. In other embodiments, the power source 115 may be only partially enclosed, not enclosed at all, and/or protected along the sides and corners by additional structure. The protective case may be sized to fit a variety of power sources 115 of a similar size, and may also be sized to fit a wide variety of off-the-shelf power sources.

Continuing with reference to FIG. 2, a set of wheels 210 may be attached to the portable power generation device 110 to improve mobility. A wheel housing 215 may be attached to each wheel 210 to protect the wheel 210 from impact. Each wheel housing 215 may extend down to provide a stable base when the portable power generation device is flat on the ground. In the embodiment as shown in FIG. 2, the wheel housing 215 is integrated with the portable power generation device 110, but it may be a separate component or omitted completely.

In the example of FIG. 2, one or more feet 230 extend down past the bottom surface of portable power generation device 110 to provide a stable base when the device 110 is flat on the ground. Feet 230 may be shaped such that they do not contact the ground when the portable power generation device is tilted during motion. Although feet 230 are integrated with the portable power generation device 110 in the example of FIG. 2, they may be separate components or omitted entirely.

In FIG. 2, a handle 220 is mounted on the front of the case. This handle 220 may be used, for example, for lifting the portable power generation device 110 and/or rolling the device 110 on wheels 210. In one embodiment, additional handles (not shown in FIG. 2) may be included to further facilitate easy handling of the portable power generation device 110. For example, in one embodiment, an additional handle is included along the side of the portable power generation device in a recessed pocket positioned near its center of gravity.

Figure 3:
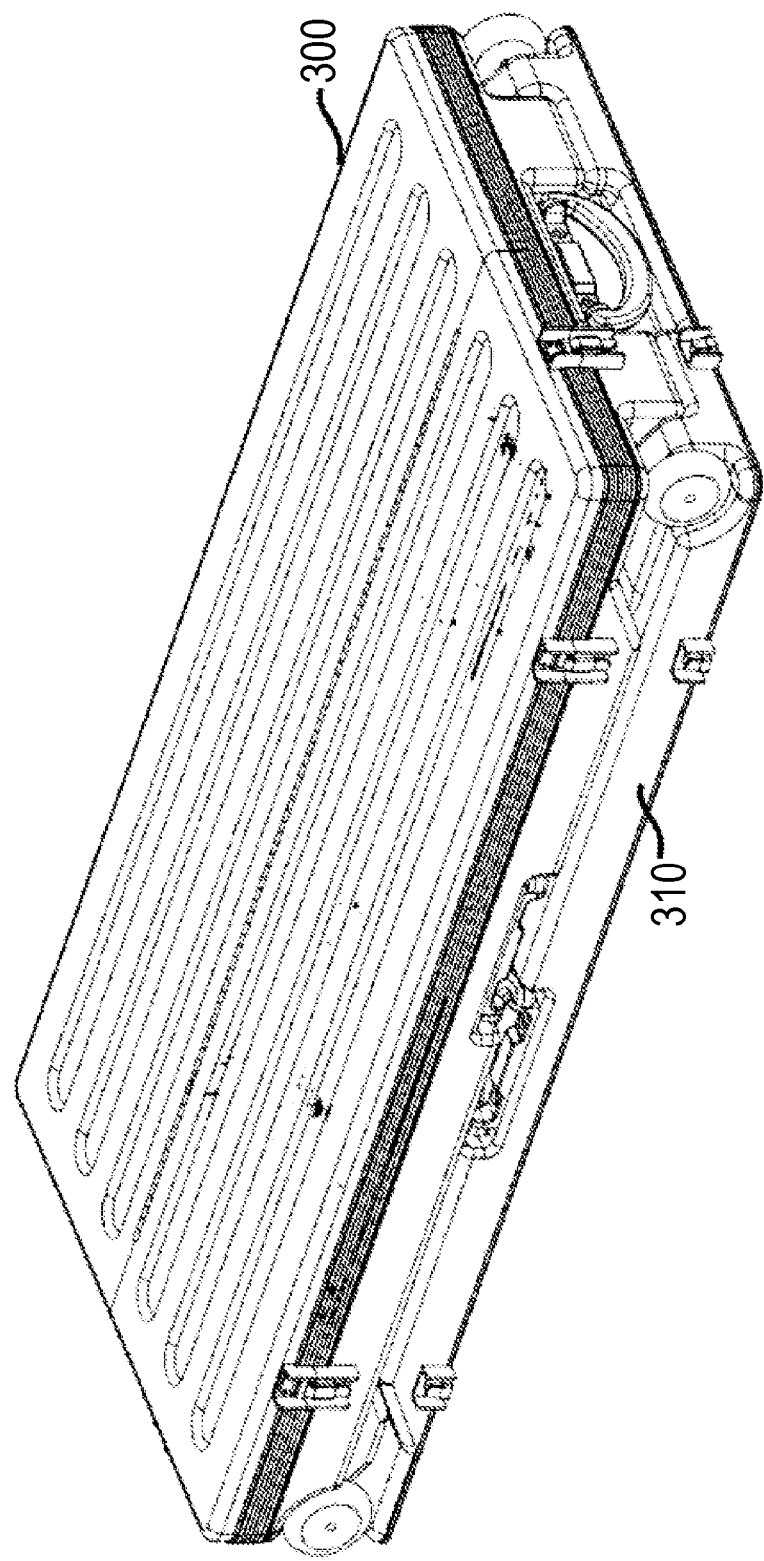
FIG. 3 illustrates a first portable power generation device stacked on top of a second portable power generation device according to one embodiment of the present invention.

FIG. 3 illustrates a first portable power generation device 300 stacked on top of a second portable power generation device 310. To allow such stacking, the protective case of each portable power generation device 300, 310 may feature surface contours that enable it to be stacked without sliding relative to units. In one embodiment, the protective case 105 may be shaped such that the bottoms of two portable power generation devices can fit together. As shown in FIG. 3, the second portable power generation device 310 may be inverted such that the pair of devices form a tight stack for storage or transportation.

The protective case 105 of the portable power generation device 110 may include additional features, or be altered depending upon the intended use the portable power generation device. For example, in one embodiment, the protective case 105 may include runners to better facilitate motion over wet and muddy surfaces. Similarly, the protective case 105 may include extra cushioned protection for various components of the portable power generation device. For example, in embodiments where the power source 115 is a solar panel, small rubber pads may be included to dampen shocks and absorb impacts on the solar panel. Additionally, the protective case 105 may be designed to raise and support the portable power generation device above the ground, thereby protecting the internal components of the device from potential dangers such as animals, insects, rain or floodwaters, or other similar nuisances. Similarly, the protective case 105 may include additional protective features such as locking mechanisms for securing the portable power generation device. When engaged, the locking mechanism may prevent the case from opening or closing, thereby providing a user with a high level of protection.

Figure 4:
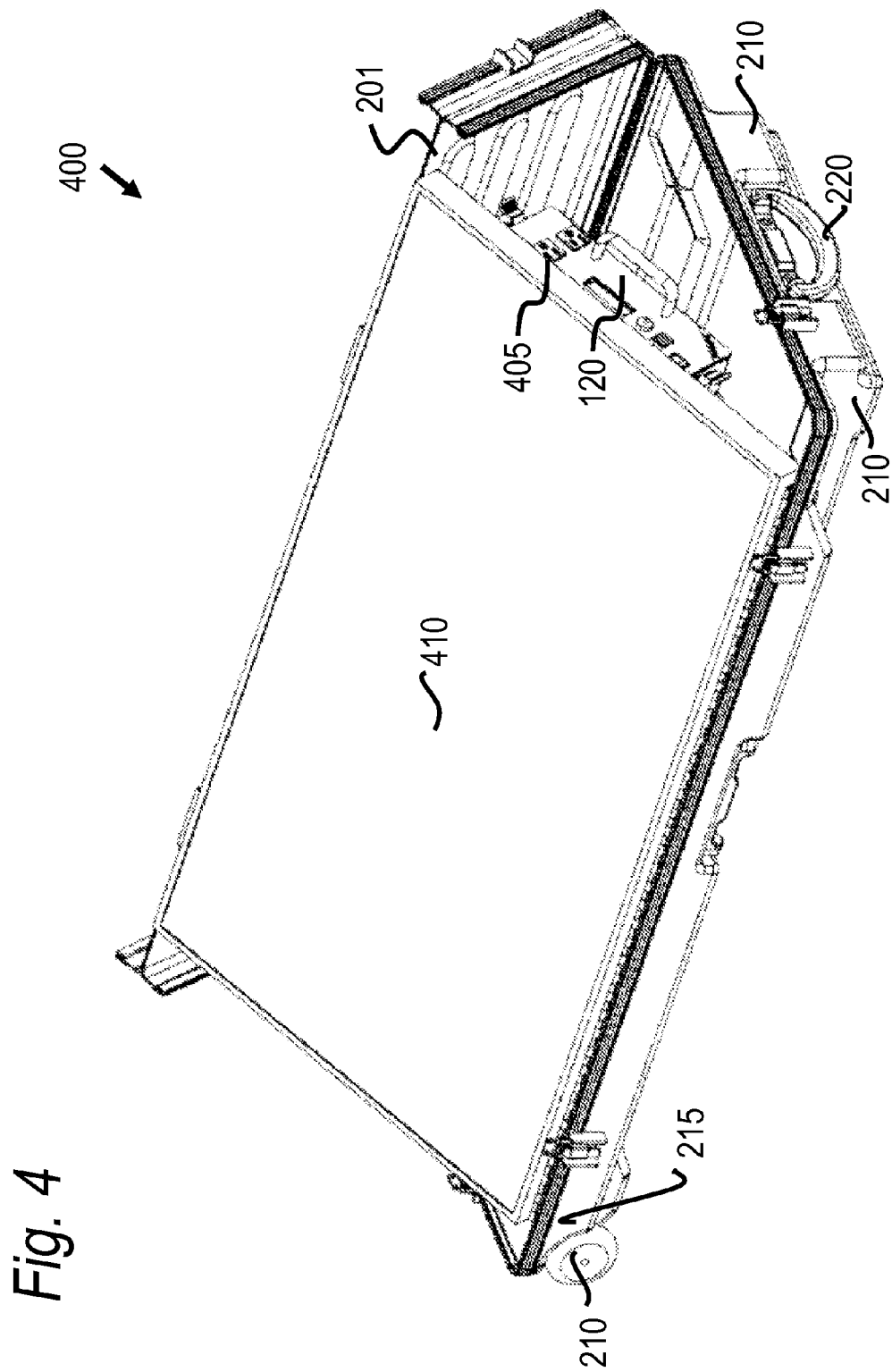
FIG. 4 illustrates an embodiment of the portable power generation device in an open configuration.

FIG. 4 illustrates an embodiment of the portable power generation device 110 in an open configuration 400. The portable power generation device 110 may be moved from a closed configuration 200 (shown in FIG. 2) to the open configuration 400 of FIG. 3 by adjusting the upper case portion segments 201 and 202. In one embodiment, the upper case portion segments 201 and 202 are in a hinged relation which allows one segment to be folded upon the other segment. In exemplary portable power generation device 110 of FIG. 3, the power source 115 comprises solar panel 410. Additionally, while the portable power generation device 110 is in open configuration 400, power control unit 120 may be visible and portions accessible to a user.

As shown in FIG. 4, the user interface 140 of the power control unit 120 may include one or more standard three-prong outlets 405 for allowing a user to connect one or more electrical devices into the power control unit. For example, the power control unit 120 may be configured to output standard 120 volt power at up to 20 amps. It should be noted that these values are provided by way of example only and could be modified accordingly. For example, the portable power generation device 110 may be configured to include outlets common to other geographic areas such as Europe or Asia. It should also be noted that these outlets are illustrated for exemplary purposes only. Any other form of AC or DC outlet may be present on the power control unit 120. For example, in one embodiment of the present invention, the power control unit 120 includes one or more USB outlets and/or 12V cigarette lighter outlets.

Figure 5:
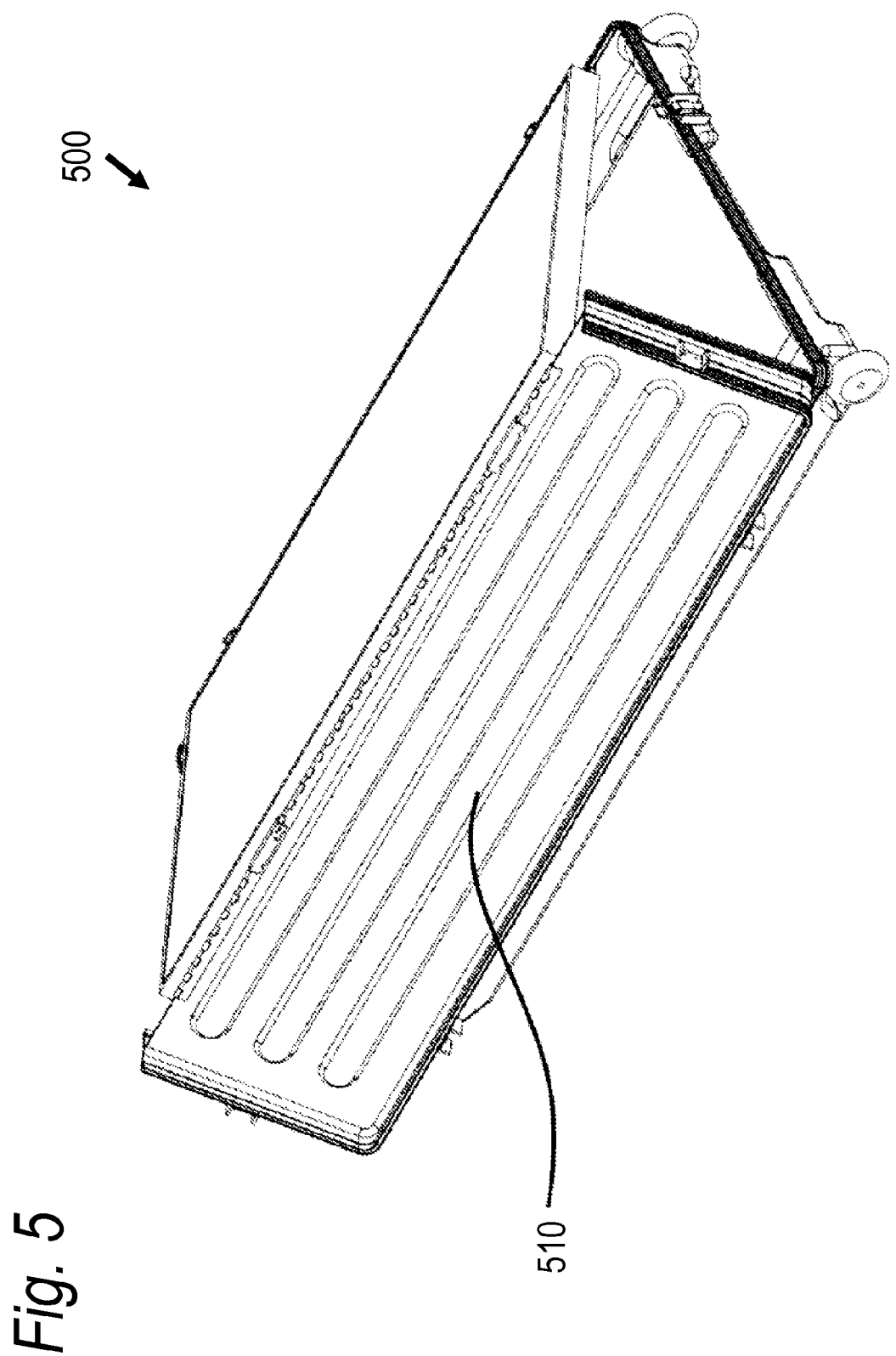
FIG. 5 illustrates an alternate view of one embodiment of the portable power generation device in an open configuration.

FIG. 5 is an alternate view 500 of the portable power generation device 110 in an open configuration. When open, at least a part of the portable power generation device 110 may form a surface 510 on which advertisements may be placed. The owner of the device may use the surface 510 to advertise their own goods. Additionally the surface 510 could be sold or rented to others. The advertisement may be a static, graphical advertisement. Alternatively, the advertisement may be a dynamic, interactive advertisement including audio and/or video. Various output devices, such as speakers and/or video screens, may be associated with the advertisement and powered by the portable power generation device 110.

Figure 6:
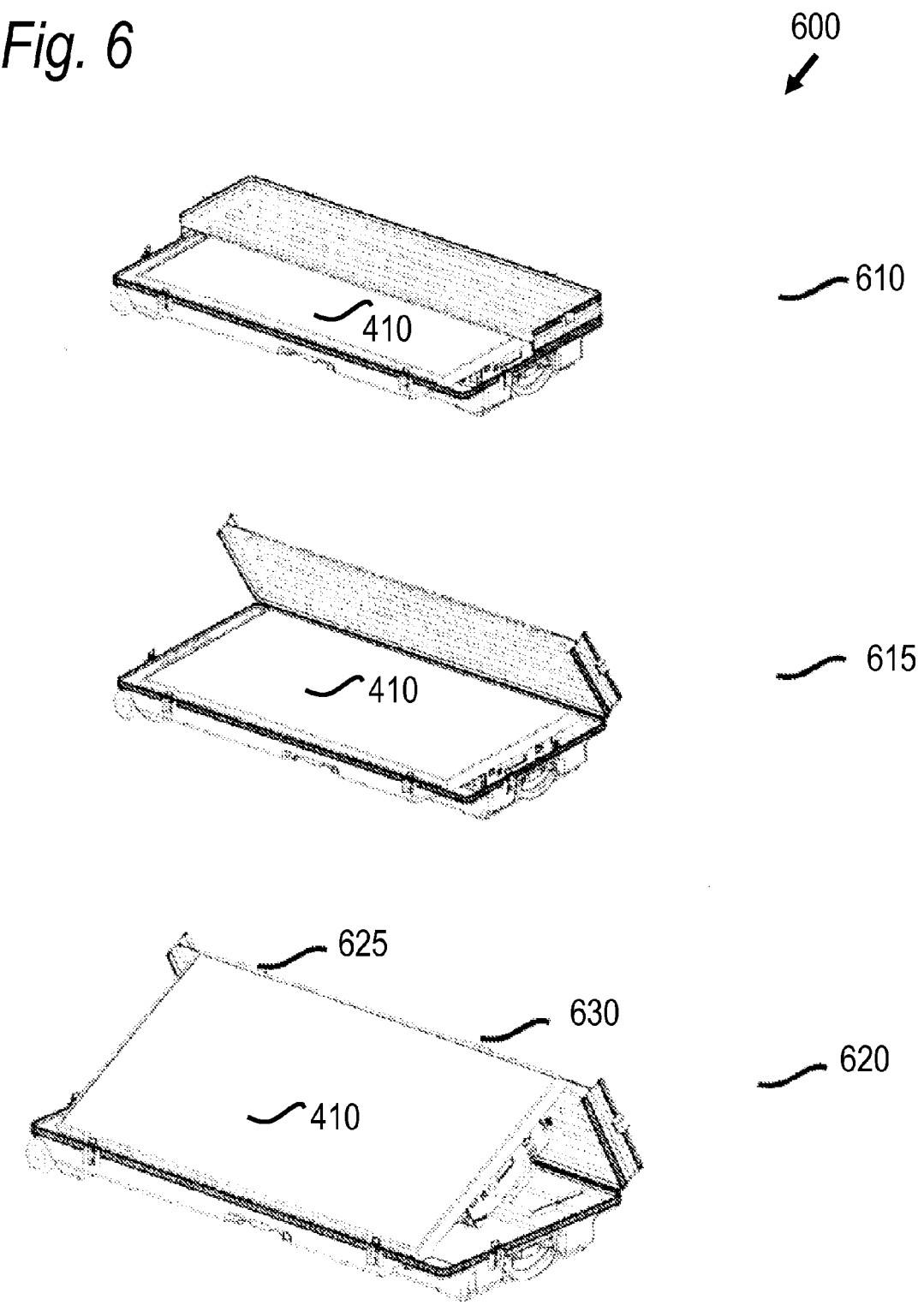
FIG. 6 illustrates an exemplary opening sequence of an embodiment of the portable power generation device, highlighting the folding and standing functionality of the protective case.

FIG. 6 illustrates an exemplary opening sequence 600 of the portable power generation device 110, highlighting the folding and standing functionality of the protective case according to one embodiment of the present invention. The example of FIG. 6 shows a portable power generation device configuration similar to FIG. 4, in which a solar panel 410 is used as the power source 115. First, as shown in a first configuration 610, one of the upper case portion segments (e.g., 201, 202 of FIG. 2) may rotate relative to the other. Then, as shown in a second configuration 615, both the upper case portion segments 200, 201 may rotate relative to the bottom case portion 205. The solar panel 410 may be mounted to the protective case by a hinge, but this motion may be accomplished by any other known pivoting means. As shown in a third configuration 620, the solar panel 410 may be rotated so that an edge of the solar panel 410 is aligned with an edge of the upper case portion segments 201, 202. The solar panel 410 may then be attached to the folded case upper case portion segments 201, 202 by means of one or more keepers 625, 630. In an exemplary embodiment of the invention, the one or more keepers 625, 630 are metal. In alternative embodiments, the one or more keepers 625, 630 may be any material suitable for fixing the solar panel 410 to the folded upper case portion segments 201, 202. In some embodiments of the invention, the keepers 625, 630 are omitted and, either the force of gravity or mechanical force (e.g., compression) may fix the solar panel to the folded upper case portion segments 201, 202.

While attached to the case, solar panel 410 may be adjusted to achieve a favorable angle to the sun. For example, in FIG. 6, the protective case (in the open configuration) tilts the solar panel 410 at about 30 degrees above the horizontal. This may allow for increased power output without the need for additional parts, thereby reducing the cost and complexity of the portable power generation device 110. In alternative embodiments, the angle at which the solar panel tilts may be any value from 0-90 degrees.

In an alternative embodiment of the opening sequence 600 of the protective case 105, rotation of the solar panel 410 may be assisted by mechanical means through a spring, linkage, actuator, or any other known method of motion assistance. In alternative embodiments of the opening and closing sequence of the protective case, the rotation of the solar panel 410 may occur automatically, or be triggered by an electromechanical input by a user through the use of a spring, linkage, actuator, or any other known method of motion assistance.

When in an open configuration, at least a part of the protective case 105 may form a surface capable of deflecting the wind from the backside of the solar panel 410. In a typical solar generator, wind against the exposed backside of the solar panel can produce a lift force, possibly moving the device. Typically, ballast in the form of additional weight is added, or the solar generator is fastened to the ground. Either of these solutions, however, reduces the mobility of the device. By protecting the backside of the solar panel 410 from wind, the portable power generation device as described herein can withstand high wind forces. To provide additional stability, the portable power generation device may also be secured to another object or anchored to the ground. For example, a stake may be driven into the ground and a cable attached thereto, the cable securing the portable power generation device to the ground.

FIG. 7 provides a perspective view 700 of the portable power generation device 120 illustrating the modularity of the power control unit 120. The power control unit 120 may be housed inside the protective case of the portable power generation device 110, or it may be externally mounted to the device 110. In one embodiment, such as illustrated in FIG. 7, the power control unit 120 is affixed directly to the back of the solar panel 410. In another embodiment, the power control unit 120 may be positioned to the back of the solar panel 410 via an attachment mechanism. For example, the power control unit 120 may be inserted into the side of the solar panel 410, thereby enabling a smaller stack height.

In one embodiment, the power control unit 120 is configured to be removable from the portable power generation device 110. Because power is often consumed remote of the generation location, e.g., inside a structure as opposed to outside in the sun where the power is generated, it is advantageous that the power control unit 120 may be quickly and easily removed from the portable power generation device 110. Power stored in the power control unit 120 may then be accessed by a user in a remote location away from the portable power generation device. For example, with reference to FIG. 7, the mechanism attaching the power control unit 120 to the solar panel 410 may include one or more quick-release devices such that the power control unit 120 may be quickly attached and removed from the portable power generation device. In one embodiment, the power control unit 120 comprises a modular unit that may be removed from a bay in the device 110 via a sliding motion. In other embodiments, the power control unit 120 may be removed or fastened to the portable power generation device 110 by other methods known in the art.

In one embodiment, the portable power generation device 110 provides a visual or auditory notification that a threshold power level has been stored in power control unit 120. In such embodiments, a user may remove the power control unit 120 from the portable power generation device 110 and connect it to one or more loads (e.g., 155 of FIG. 1).

While various aspects and embodiments have been disclosed herein, other aspects and embodiments will be apparent to those skilled in the art. It will be appreciated that several of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art. The various aspects and embodiments disclosed herein are for purposes of illustration and are not intended to be limiting, with the true scope and spirit being indicated by the following claims.

What is claimed is:

1. A method for operating a portable power generation device having a solar panel and a protective case with an upper case portion and a lower case portion, the method comprising the steps of:
    moving the upper case portion into an initial configuration by rotating a first segment of the upper case portion relative to a second segment of the upper case portion;
    moving the upper case portion from the initial configuration to an open configuration by rotating the upper case portion relative to the lower case portion;
    rotating the solar panel relative to the lower case portion to align an edge of the solar panel with an edge of the upper case portion in the open configuration; and
    engaging the edge of the solar panel with the edge of the upper case portion in the open configuration.

2. The method of claim 1, further comprising the step of:
    connecting at least one load to a power control unit operably coupled to the power generation device.

3. The method of claim 2, further comprising the step of:
    determining that a threshold power level has been stored in a power control unit located in the power generation device;
    removing the power control unit from the power generation device; and
    connecting at least one load to the removed power control unit.

* * * * *